United States Patent
Nishimura

(10) Patent No.: US 6,717,340 B2
(45) Date of Patent: Apr. 6, 2004

(54) ELECTRON-EMITTING DEVICE AND IMAGE-FORMING APPARATUS

(75) Inventor: Michiyo Nishimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/254,504

(22) Filed: Sep. 26, 2002

(65) Prior Publication Data

US 2003/0067259 A1 Apr. 10, 2003

(30) Foreign Application Priority Data

Sep. 26, 2001 (JP) ........................... 2001-294940

(51) Int. Cl.⁷ ................................................ H01J 1/02
(52) U.S. Cl. ........................................ 313/310; 313/495
(58) Field of Search ................................. 313/310, 495

(56) References Cited

U.S. PATENT DOCUMENTS 6,028,391 A 2/2000 Makishima ............... 313/310
6,267,636 B1 7/2001 Onishi et al. ............... 445/6
6,379,211 B2 4/2002 Onishi et al. .............. 445/73

FOREIGN PATENT DOCUMENTS

JP 8-115654 5/1996
JP 10-125215 5/1998

*Primary Examiner*—Vip Patel
(74) *Attorney, Agent, or Firm*—Fitzpatrick, Cella, Harper & Scinto

(57) ABSTRACT

An electron-emitting device having a small electron beam size is proposed. In order to provide a high definition image display device having high image quality by utilizing this type of electron-emitting device and an electron source, a cathode electrode (2) has an opening which is trenched in a portion thereof, and further, the depth at which the opening is trenched is deep at a peripheral portion of the opening bottom face, and shallow at a central portion of the opening bottom face. A surface of an electron-emitting material is formed in a portion deeper than a boundary surface between the cathode electrode and an insulating layer.

11 Claims, 14 Drawing Sheets

ELECTRON-EMITTING DEVICE AND IMAGE-FORMING APPARATUS

BACKGROUND OF THE INVENTION

1. Field of the Invention

The present invention relates to an electron-emitting device, and in addition, to an image-forming apparatus which uses the electron-emitting device.

2. Related Background Art

Two types of electron-emitting devices are known conventionally: the thermoelectron source type and the cold cathode electron source type. Of these, the cold cathode electron source type refers to devices including field emission type (hereinafter referred to as the FE type) electron-emitting devices, metal/insulation layer/metal type (hereinafter referred to as the MIM type) electron-emitting devices, surface conduction type electron-emitting devices, and the like.

In order to apply these types of electron-emitting devices in to an image-forming apparatus, an emission current that causes a phoshor to emit light with a sufficient luminance is necessary. Further, to obtain high definition display, electron beams to be irradiated to the fluorescent material are required to have a small diameter. In addition, ease of manufacture is also very important factor.

A Spindt type electron-emitting device is an example of a conventional FE type device. A structure in which a microtip is formed as an emission point, and electrons are emitted from a leading edge of the microtip is general for the Spindt type. Thermal destruction of an electron-emitting portion is induced, and the lifetime of an FE type device becomes limited, if the emission current density for causing the fluorescent material emit light is made large. Furthermore, there is a tendency for electrons emitted from the leading edge spread out due to an electric field formed by a gate electrode, and the beam size cannot be made smaller.

Various examples are proposed as individual solutions in order to overcome those kinds of FE type device disadvantages.

An example of disposing a convergence electrode above the electron-emitting portion is shown as an example of preventing electron beam expansion. This is generally performed by narrowing down an emitted electron beam by using a negative electric potential of the convergence electrode, but the manufacturing process thereof becomes complex and this invites a large increase in manufacturing costs.

An example disclosed in JP 8-115654 A is shown in FIG. 13. This is a structure in which an electron-emitting surface exists in a location within a microscopic opening deep from a surface of an electron-emitting substrate insulating layer. In FIG. 13, a cathode electrode 32, an insulating layer 33, and a gate electrode 34 are formed on a substrate 31, and an electron-emitting material 35 is disposed within a microscopic opening 36. The electron-emitting material 35 is disposed in a trenched portion in the cathode electrode 32, so that it is disposed at apposition which is deep from a boundary between the cathode electrode 32 and the insulating layer 33. Reference numeral 37 denotes an anode electrode with which emitted electrons collide.

In this structure, electron emission is performed from a thin film disposed within the trenched opening, and therefore there is an advantage in that a flat and equipotential surface is formed on the electron-emitting surface and spreading of the electron beam becomes smaller. Further, by using a low work function structuring material as an electron-emitting substance, electron emission is possible even if a microtip is not formed. As a result, low voltage drive is achieved. Furthermore, there is an advantage in that the manufacturing method is relatively simple. In addition, electron emission is performed by a surface, and therefore electric field concentration does not occur, tip destruction does not occur, and it has a long life.

In the above-mentioned structure, a step distance between the cathode electrode 32 and the electron-emitting material 35 largely depends upon an electric field applied to a surface of the electron-emitting material 35, and therefore it is necessary to accurately control the step difference.

Further, FIG. 14A and FIG. 14B show an example disclosed in JP 10-125215 A. This structure is also a technique of forming the electron-emitting material 35 inside the cathode electrode 32. In this example, for cases of forming the electron-emitting material 35 in a step portion, it is necessary to consider the trajectory of the electron beam in the step portion. Further, although it is appropriate that the electron-emitting material 35 only exist on a bottom face of the trenched portion in the cathode electrode 32 in the opening, cases in which the electron-emitting material 35 remains in a side wall portion of the opening by manufacturing method can also be considered.

There are cases in which the electron-emitting material 35 remaining in the side wall portion obstructs an electron emission, or causes reduction of the insulating property between the cathode electrode 32 and the gate electrode 34. In particular, a leak current flows between the cathode electrode 32 and the gate electrode 34 if the electron-emitting material 35 is a conductor, and this becomes a primary factor in reducing the electron emission efficiency.

SUMMARY OF THE INVENTION

An objet of the present invention is to provide an electron-emitting device in which electron beam size can be made smaller, and an image-forming apparatus that uses the electron-emitting device.

In order to achieve the aforementioned objective, an electron-emitting device according to the present invention comprises:

a cathode electrode;

an insulating layer;

a gate electrode;

a substrate on which laminated the cathode electrode, the insulating layer and the gate electrode;

an opening penetrating the insulating layer and the gate electrode; and an electron-emitting material disposed within the opening;

wherein an opening bottom face is formed of a portion of the cathode electrode exposed through the opening and is elevated on a central portion compared with a peripheral portion; and a surface of the electron-emitting material existing at least the elevated central portion of the opening bottom face is positioned lower than the height of a boundary between the cathode electrode and the insulating layer.

It is preferable that the surface area of the electron-emitting material is substantially equal to, or less than the area of the opening region penetrating the gate electrode.

It is preferable that the electron-emitting material be a substantially flat film.

With this an electron-emitting device having a small beam size can thus be structured. In addition, a structure of an electron-emitting device having low leakage is also possible.

It is preferable that the electron-emitting material be at least one material selected from the group consisting of diamond, diamond like carbon, a carbon nano-tube, and a graphite nano-fiber, having a low work function.

With this, an electron-emitting device capable of low voltage drive can thus be structured.

It is preferable that a portion of the cathode electrode existing the central portion be separated by the peripheral portion of the opening bottom face, and be electrically connected by the electron-emitting material laminated on the peripheral portion of the opening bottom face.

In this case, the structure becomes one in which a limiting resistance is added to the electron-emitting material, and the electron emission current can be stabilized.

It is preferable that the electron-emitting material be a higher resistance film than the cathode electrode.

It is preferable that the cathode electrode be structured from a plurality of layers having different resistivities.

It is preferable that the electron-emitting material be formed while being sandwiched by the cathode electrodes.

In this case, the electron-emitting material is laminated in advance, and therefore influence of the leak current can also be avoided.

An image-forming apparatus of the present invention is characterized by comprising an electron source using the electron-emitting device of the present invention, and an image-forming material which forms an image by using electrons emitted from the electron source.

The electron source and the image-forming apparatus, to which the electric field emission device according to the present invention is applied, can therefore be formed in higher definition.

DETAILED DESCRIPTION OF THE PREFERRED EMBODIMENTS

Hereinafter, a preferred embodiment mode of the present invention will be explained as an example in detail with reference to the drawings. Note that, with regard to dimensions, materials, shapes, and relative arrangement of components described in this embodiment mode, there is no intention to limit the scope of the present invention thereto unless otherwise specifically described. Also, with regard to conditions such as a voltage applied to a cathode electrode, a gate electrode, and an anode electrode, and a driving waveform, there is no intention to limit the scope of the present invention thereto unless otherwise specifically described.

By referring to FIGS. 1A to 4G, description will be made of an electron-emitting device in accordance with an embodiment mode of the present invention.

Figure 1A:
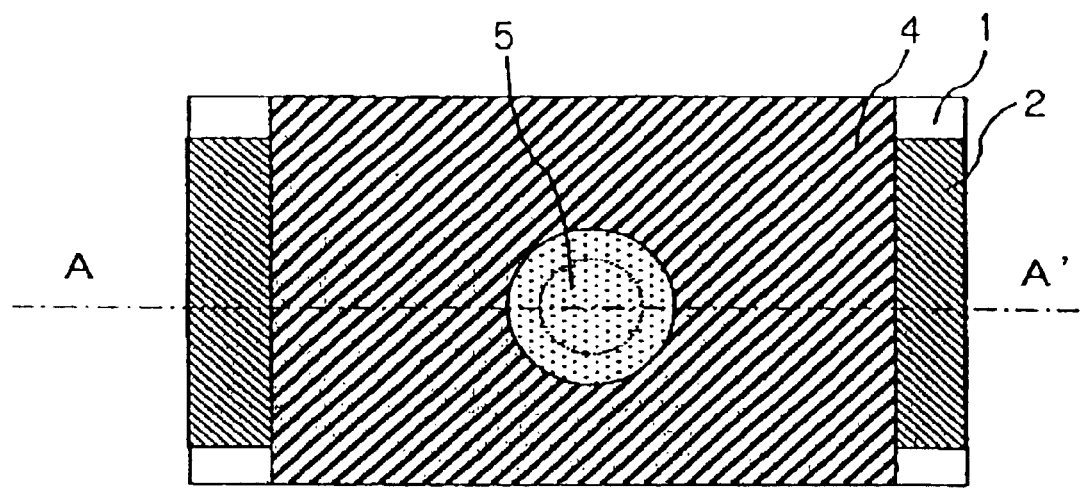
FIG. 1A is a plan view showing an electron-emitting device in accordance with an embodiment mode of the present invention.
Figure 1B:
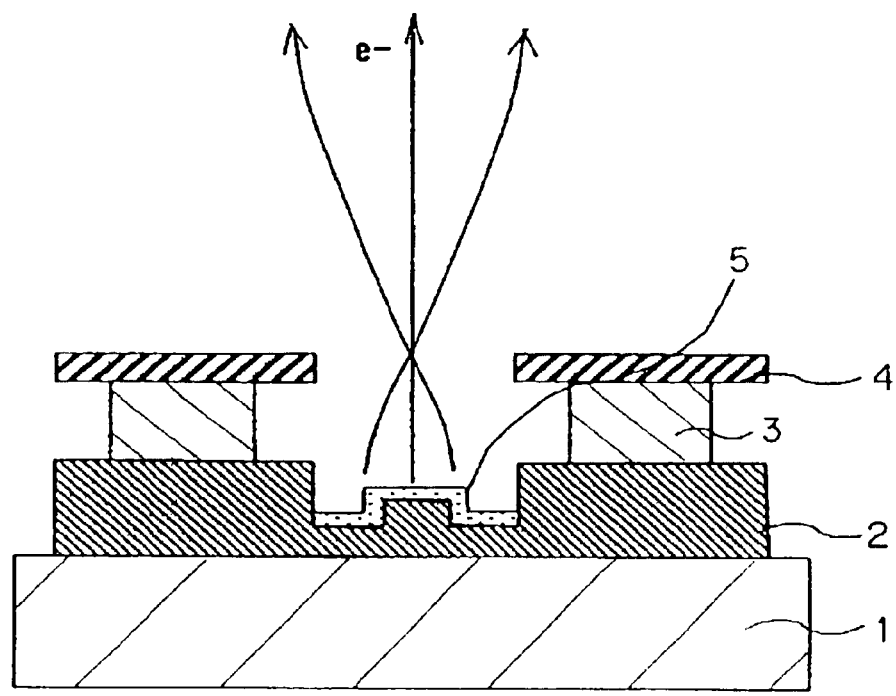
FIG. 1B is a cross sectional view taken along the line A–A' of FIG. 1A.
Figure 2:
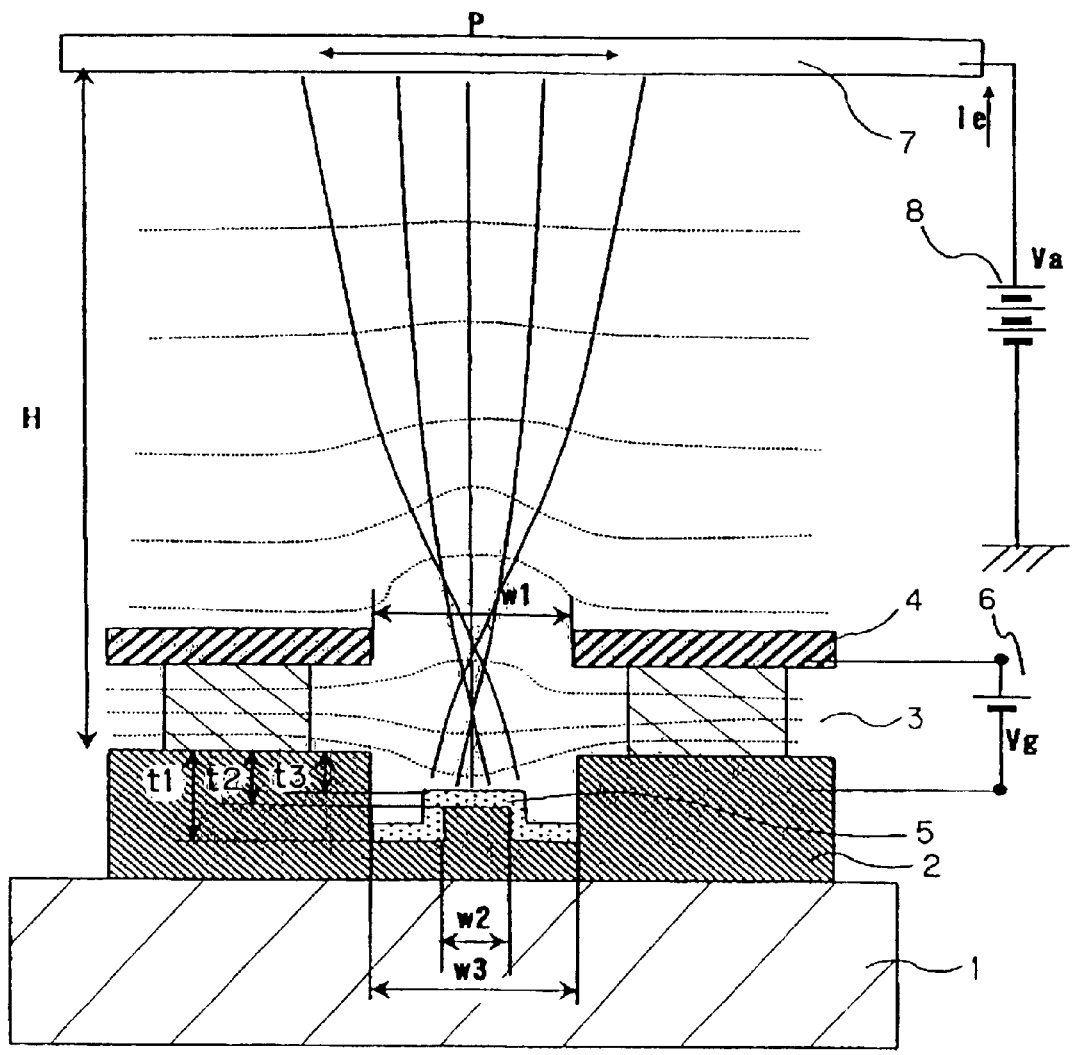
FIG. 2 is a schematic view showing an electron trajectory of the electron-emitting device in accordance with an embodiment mode of the present invention.

FIG. 1A, FIG. 1B, and FIG. 2 are schematic diagrams showing an electron-emitting device of this embodiment mode of the invention. FIG. 1A is a plan view, FIG. 1B is a cross sectional view taken along the line A–A' of FIG. 1A, and FIG. 2 is a detailed diagram showing an operation state of the electron-emitting device of FIG. 1.

In FIG. 1A, FIG. 1B, and FIG. 2, reference numeral 1 denotes a substrate, 2 denotes a cathode electrode, 3 denotes an insulating layer, 4 denotes a gate electrode, and 5 denotes an electron-emitting material.

A drive voltage Vg is applied between the cathode electrode 2 and the gate electrode 4 by a power source 6.

Reference numeral 7 denotes an anode electrode disposed above the electron-emitting device, separated by a distance H, and an anode voltage Va is applied thereto by a high voltage power source 8. The position of the device having the distance H between the anode electrode and the device may normally be determined based upon the position of the cathode electrode 2. Electrons are arrived at the anode electrode 7, and an electron-emitting current Ie is detected.

The insulating layer 3 and the gate electrode 4 have openings penetrating therethrough. The opening has a circular shape in this embodiment mode, and the diameter of the opening is w1.

The opening of the insulating layer 3 may be identical to the opening diameter w1 of the gate electrode 4, and may be smaller or larger than that. However, it is preferable that the opening of the insulating layer 3 be disposed so as not to block the trajectory of an electron beam for cases in which it is larger than the opening of the gate electrode 4.

A portion of the cathode electrode 2 has a concave portion with an opening diameter w3, and further, the depth of the concave portion becomes deeper at a peripheral portion of a opening bottom face (depth of the peripheral portion of the opening bottom face from a boundary surface between the cathode electrode 2 and the insulating layer 3=t1). A central portion of the opening bottom face protrudes from the peripheral portion of the opening bottom face. The diameter of a protruding portion (central portion of the opening bottom face) is w2, and the depth of the central portion of the opening bottom face from a boundary surface between the cathode electrode 2 and the insulating layer 3 becomes t2.

The electron-emitting material 5 is laminated on the opening bottom face of the cathode electrode 2 inside the opening, and is electrically connected to the cathode electrode 2. It is preferable that the electron-emitting material 5 be formed such that the size of its surface area is substantially equivalent to, or slightly smaller than that of the opening region of the gate electrode 4. The surface of the electron-emitting material 5 is formed in a position, which is deeper by a depth of t3 than a boundary surface between the cathode electrode 2 and the insulating layer 3.

In this case, the effect of the present invention can be obtained with any size of w1, provided that size of t2 or t3 is optimized according to size of w1. However, the effect according to changing size of t2 becomes smaller if size of w1 is large. Thus w1<k×t2 (an effective k is from several times to 100, and at most is on the order of 1000).

Further, if t2 or t3 are too deep, then an electric field strength of electron-emitting material 5 becomes low. In order to compensate to thereby form the electric field, if the electric field is strengthened (the driver voltage is increased), the beam size does not shrink by much. Thus, the range of parameters within which the effect of the present invention is obtained is regulated with each other.

Consequently, with respect to a preferable size, t2 (or t3)≈(w3−w2)/2 is effective in order to obtain high efficiency, and further, t2 (or t3)≦(w3−w2)/2 is effective in order to shrink the beam size. Therefore, size of t2 (or t3)in which t2 (or t3)≦(w3−w2)/2 is a preferably.

A broken line within FIG. 2 shows an equipotential electric field profile for a case of driving this device. The shape of the equipotential electric filed profile changes due to the driving conditions, and FIG. 2 shows an equipotential electric field profile at general driving conditions in the present invention.

With the electron-emitting device in accordance with this embodiment mode, this becomes a concave shape equipotential surface in the vicinity of the electron-emitting material 5 due to the depth t3, and a convex shape in the vicinity of the opening of the gate electrode 4. Therefore, an electron is emitted substantially straight from the electron-emitting region in the center of the opening (the central portion of the opening bottom face), but the trajectory of an electron which is emitted from a portion near the peripheral portion of the opening is bent toward the center.

Therefore, the beam of the electrons that arrive at the anode electrode 7 has the size indicated by reference symbol P shown in FIG. 2 taking the emitted electrons as an overall beam.

Figure 13:
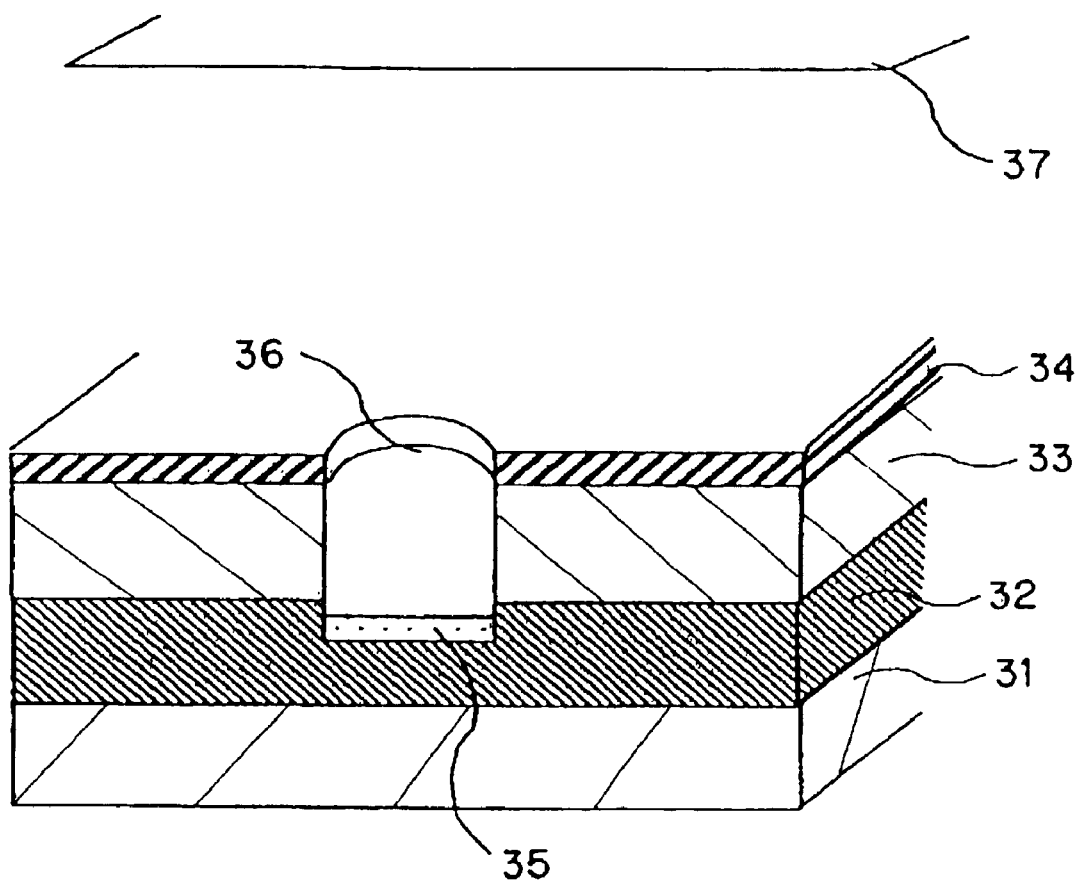
FIG. 13 is a cross sectional view showing a conventional electron-emitting device.
Figure 14A:
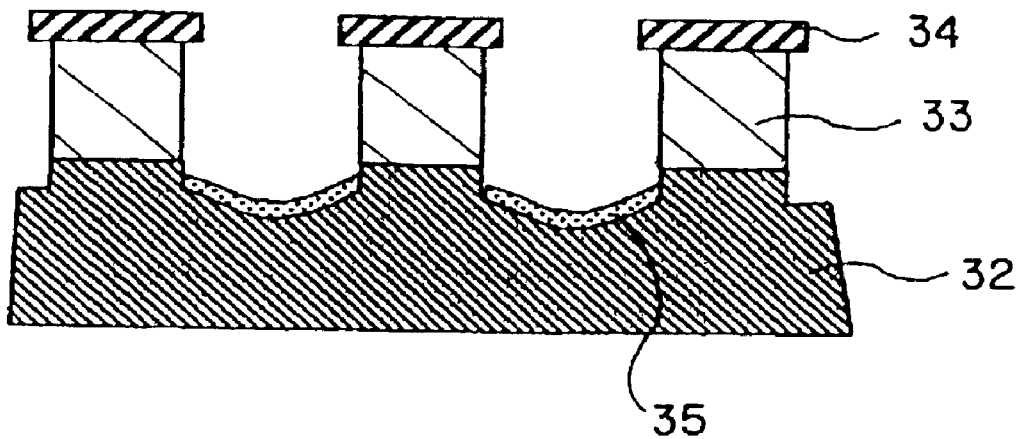
FIG. 14A is a cross sectional view showing another conventional electron-emitting device.
Figure 14B:
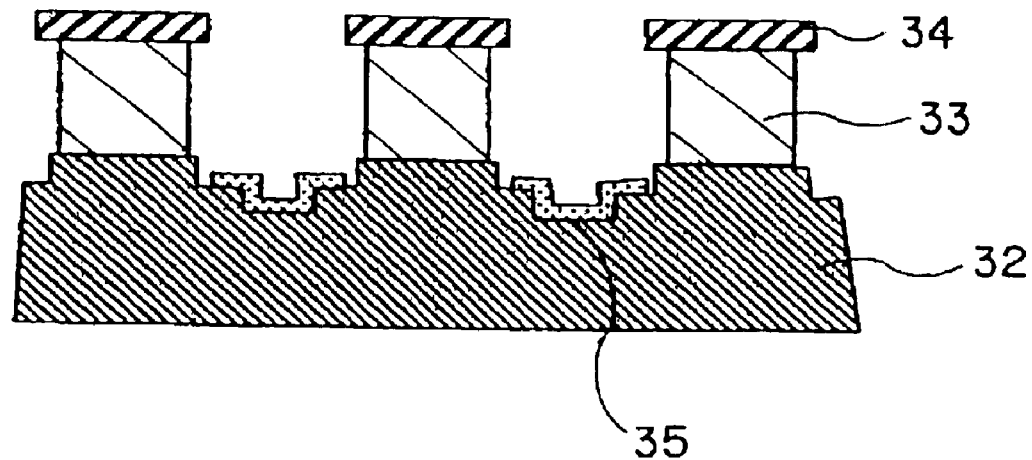
FIG. 14B is a cross sectional view showing yet another conventional electron-emitting device.

In case of the electron-emitting device according to this embodiment mode, even if the electron-emitting material 5 is provided at the peripheral portion of the opening bottom face in which the cathode electrode 2 is deeply trenched, the electric field strength of electron-emitting material 5 is low, and therefore almost no electrons are emitted. Therefore, the electron-emitting region is limited to only the central portion of the opening bottom face where the depth of the cathode electrode 2 is set as t2. Consequently, the amount of electrons emitted is reduced compared to a conventional electron-emitting device as shown in FIG. 13. However, the beam size P becomes smaller so much. Note that, the electric field of the surface of the electron-emitting material 5 depends upon the convex shape of the central portion of the opening bottom face of the cathode electrode 2, and in edge portions where the cathode electrode 2 has different depths, the electric field strengthens, and the electric field profile changes slightly. However, the edge portions are in the deep position from the boundary surface between the cathode electrode 2 and the insulating layer 3, and therefore there are no such remarkable changes as becoming a convex shape equipotential electric field profile from a concave shape equipotential electric field profile. Further, even if there is a little change, the influence on the electron beam size is small, on the order of shifting the electron beam slightly toward the central portion in that location. Furthermore, controlling the depth of the opening of the peripheral portion has a large margin because the electric field profile substantially does not change even with increasing the depth.

Therefore, compared to the conventional devices, the emission region can therefore be limited to the center of the opening without greatly changing the electron beam trajectory itself, and the beam size can be made smaller.

In addition, in this structure, by trenching into the opening bottom face deeply in the peripheral portion, the amount of the electron-emitting material adhering to side walls of the opening is reduced, the insulating property between the cathode electrode 2 and the gate electrode 4 is not lowered, and the leak current can be reduced.

Figure 3:
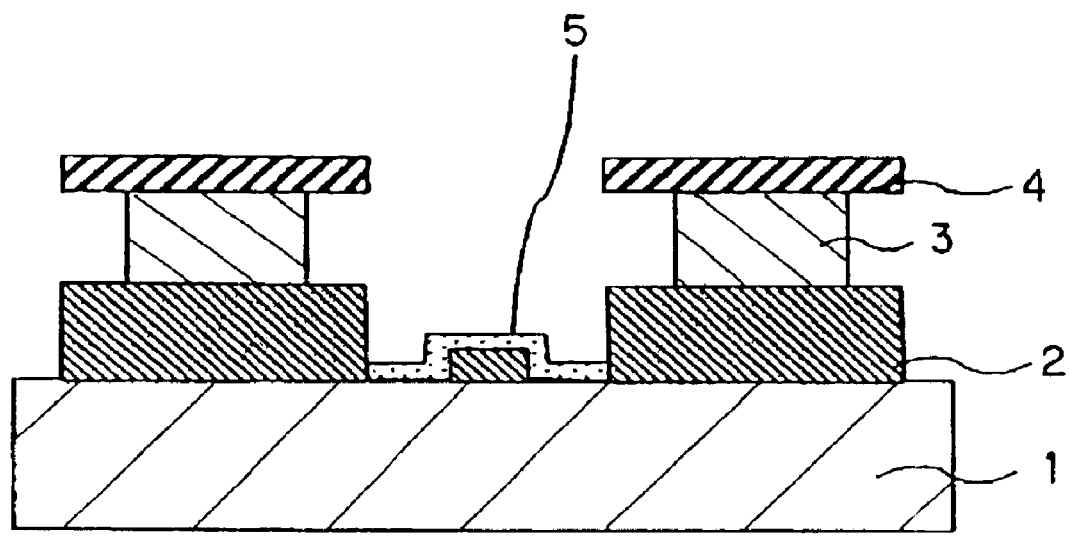
FIG. 3 is a cross sectional view showing an electron-emitting device in accordance with another embodiment mode of the present invention.

FIG. 3 is a cross sectional view showing an alternative example of an electron-emitting device in accordance with this embodiment mode of the present invention. Note that a plan view of the device shown in FIG. 3 is the same as FIG. 1A.

In the structure of FIG. 3, the cathode electrode 2 is trenched through in the peripheral portion of the opening bottom face, the cathode electrode 2 of the central portion of the opening bottom face is separated from the surrounding cathode electrode 2. However, The cathode electrode 2 of the central portion is electrically connected to the surrounding cathode electrode 2 in the horizontal direction through the electron-emitting material 5.

Even if the electron-emitting material 5 has conductivity, it has high resistance if the film thickness is thin, and therefore the electron-emitting material 5 of the peripheral portion of the opening bottom face functions as a resistor, and as a mechanism for limiting an electric current in the electron-emitting region. The electron emission current can therefore be stabilized.

An example of a manufacturing method for the electron-emitting device of this embodiment mode is explained below with reference to FIGS. 4A to 4G.

Figure 4A:
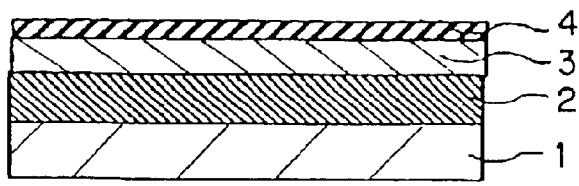
FIGS. 4A to 4G are diagrams showing an example of a method of manufacturing an electron-emitting device of the present invention.

As shown in FIG. 4A, a substrate which has sufficiently cleaned surface, and is made of quartz glass, glass in which the amount of impurities such as Na is reduced, soda lime glass, a silicon substrate, a lamination member configured by laminating $SiO_2$ on a silicon substrate or the like by a sputtering method or the like, or an insulating substrate such as ceramic such as alumina, is prepared. The cathode electrode 2 is laminated on the substrate 1.

The cathode electrode 2 generally has conductive property, and is formed by a general film formation technique such as deposition, sputtering, or CVD, and a photolithography technique or the like. The cathode electrode 2 material may be suitably selected, for example, from: metals or alloy materials such as Be, Mg, Ti, Zr, Hf, V, Nb, Ta, Mo, W, Al, Cu, Ni, Cr, Au, Pt, and Pd; carbides such as TiC, ZrC, HfC, TaC, SiC, and WC; borides such as $HfB_2$, $ZrB_2$, $LaB_6$, $CeB_6$, $YB_4$, and $GdB_4$; nitrides such as TiN, ZrN, and HfN; semiconductors such as Si and Ge; organic polymer materials; amorphous carbon; graphite; diamond like carbon; and carbon and carbide compounds in which diamond is dispersed. The thickness of the cathode electrode 2 is set in a range from several tens of nanometers to several millimeters, and preferably is selected in a range from several hundreds of nanometers to several micrometers.

Further, a portion of an insulating silicon substrate may be doped to have conductivity and used as the cathode electrode 2. Furthermore, the cathode electrode 2 may also be a structure with multiple layers having different compositions, and may also be a laminate of completely different materials. The cathode electrode 2 may also have a portion laminated with a high resistance material.

The insulating layer 3 and the gate electrode 4 are then deposited after the formation of the cathode electrode 2.

The insulating layer 3 is formed by sputtering, CVD, vacuum deposition, coating, or the like, and its thickness is set within a range from several nanometers to several micrometers, preferably selected in a range from several tens of nanometers to several hundreds of nanometers. It is preferable to use materials having high resistance to voltage and able to withstand a high electric field, such as $SiO_2$, SiN, $Al_2O_3$, and CaF.

The gate electrode 4 has conductivity similar to that of the cathode electrode 2, and is formed by a general film formation technique such as deposition or sputtering, and a photolithography technique or the like. The gate electrode 4 material may be suitably selected, for example, from: metals or alloy materials such as Be, Mg, Ti, Zr, Hf, V, Nb, Ta, Mo, W, Al, Cu, Ni, Cr, Au, Pt, and Pd; carbides such as TiC, ZrC, HfC, TaC, SiC, and WC; borides such as $HfB_2$, $ZrB_2$, $LaB_6$, $CeB_6$, $YB_4$, and $GdB_4$; nitrides such as TiN, ZrN, and HfN; semiconductors such as Si and Ge; and organic polymer materials.

Then, an opening is manufactured. The peripheral portion of opening is manufactured as a first stage.

Figure 4B:
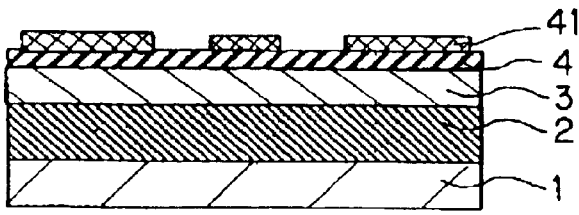

A mask pattern 41 is formed as shown in FIG. 4B by using a photolithography technique in order to manufacture the opening.

Figure 4C:
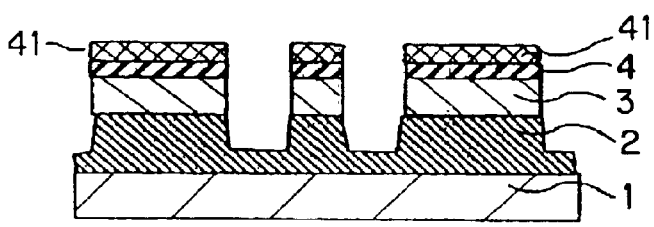

A portion of the gate electrode 4, the insulating layer 3, and the cathode electrode 2 is removed next as shown in FIG. 4C by utilizing a mask pattern 41. Manufacture of the opening may be performed by suitably selecting an appropriate method, such as dry etching or wet etching, in accordance with the materials used in the gate electrode 4, the insulating layer 3, and the cathode electrode 2, and the thickness of each layer.

Further, partial micromachining such as focused ion beam (FIB) etching may also be used optionally.

The central portion of the opening is manufactured next.

Figure 4D:
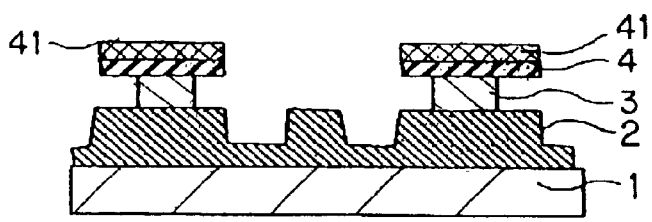

The central portion of the insulating layer 3 is removed by side etching, as shown in FIG. 4D, by performing isotropic etching using wet etching. The gate electrode material on the central portion is lifted off.

Figure 4E:
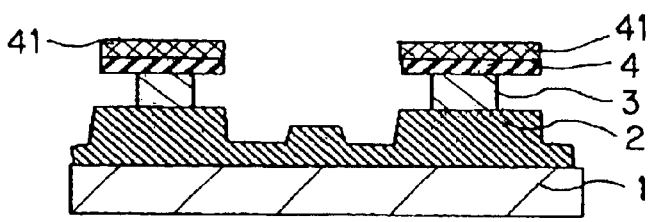

In addition, the cathode electrode 2 of the opening portion is etched as shown in FIG. 4E. Although a selective etching method for etching only the projecting portion within the opening portion is shown here, the overall opening portion may also be made thinner by using anisotropic etching, such as ion milling or reactive ion milling.

Figure 4F:
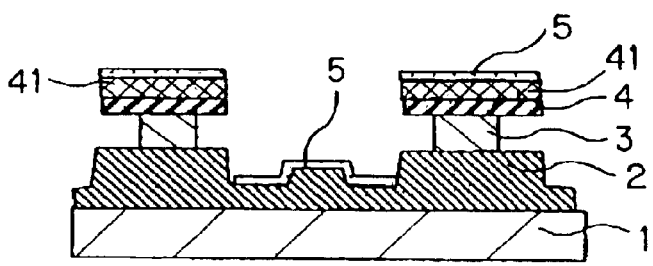

Then, as shown in FIG. 4F, the electron-emitting material 5 is deposited over the surface.

The electron-emitting material 5 is formed by a general film formation technique such as coating, deposition, sputtering, plasma CVD, or thermal CVD, or the like. It is preferable to select a low work function material as the material for the electron-emitting material 5. For example, the material may be suitably selected from amorphous carbon, graphite, diamond like carbon, diamond, carbon nano-tube, carbon and carbon compounds in which graphite nano-fiber is dispersed, and the like. Preferably, a low work function diamond thin film, diamond like carbon, carbon nano-tubes, graphite nano-fibers or the like is used. The film thickness of the electron-emitting material 5 is set in a range from several nanometers to several hundreds of nanometers, preferably in a range from several nanometers to several tens of nanometers.

It is necessary that the electron-emitting material 5 be electrically connected to the cathode electrode 2, and thus it is preferable that the electron-emitting material 5 have conductivity. For example, it is necessary to add conductivity by doping or the like if the material used has insulating property. Further, although the same material can be selected for the cathode electrode 2 and the electron-emitting material 5, as stated above, it is preferable that the electron-emitting material 5 be formed of a material other than that used for the cathode electrode, and that the material have a higher resistance than the cathode electrode 2 material.

Provided that the electric field needed in order for electrons to be emitted from the electron-emitting material 5 is made as low as possible, the driver voltage can be lowered. The driver voltage can be reduced to the order of 10 plus several volts provided that the electric field is approximately equal to or less than $1 \times 10^7$ V/m, and this is preferable.

Figure 4G:
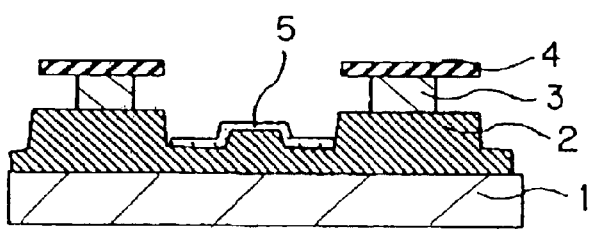

If the mask pattern 41 is then peeled off as shown in FIG. 4G, a device like that shown in FIGS. 1A and 1B is completed.

The diameter w1 of the opening in the gate electrode 4 is a factor that greatly influences the size of the beam diameter, and thus is very important. The diameter w1 is preferably from 100 nm to several hundreds of micrometers. More preferably, the diameter is from 100 nm to 1 $\mu$m.

Note that the electron-emitting material 5 may also be disposed as shown in FIG. 3 such that it contacts the separated cathode electrodes 2.

The electron-emitting device of this embodiment mode has an extremely simple structure in which laminates are repeated, its manufacturing processes are easy, and it can be manufactured with good yields.

An application example of the electron-emitting device of this embodiment mode is discribed below. An electron source or an image-forming apparatus, for example, can be structured by arranging the electron-emitting devices of this embodiment mode on a plurality of substrates.

Many kinds of electron-emitting device arrangement can be employed. One example is a simple matrix arrangement in which a plurality of the electron-emitting devices are disposed in a matrix shape in the x-direction and the y-direction, wherein one electrode on each of the plurality of electron-emitting devices disposed in the same row is connected in common to an x-directional wiring, while the other electrode on each of the plurality of electron-emitting devices disposed in the same column is connected in common to a y-directional wiring. A detailed explanation of the simple matrix arrangement is given below.

Figure 5:
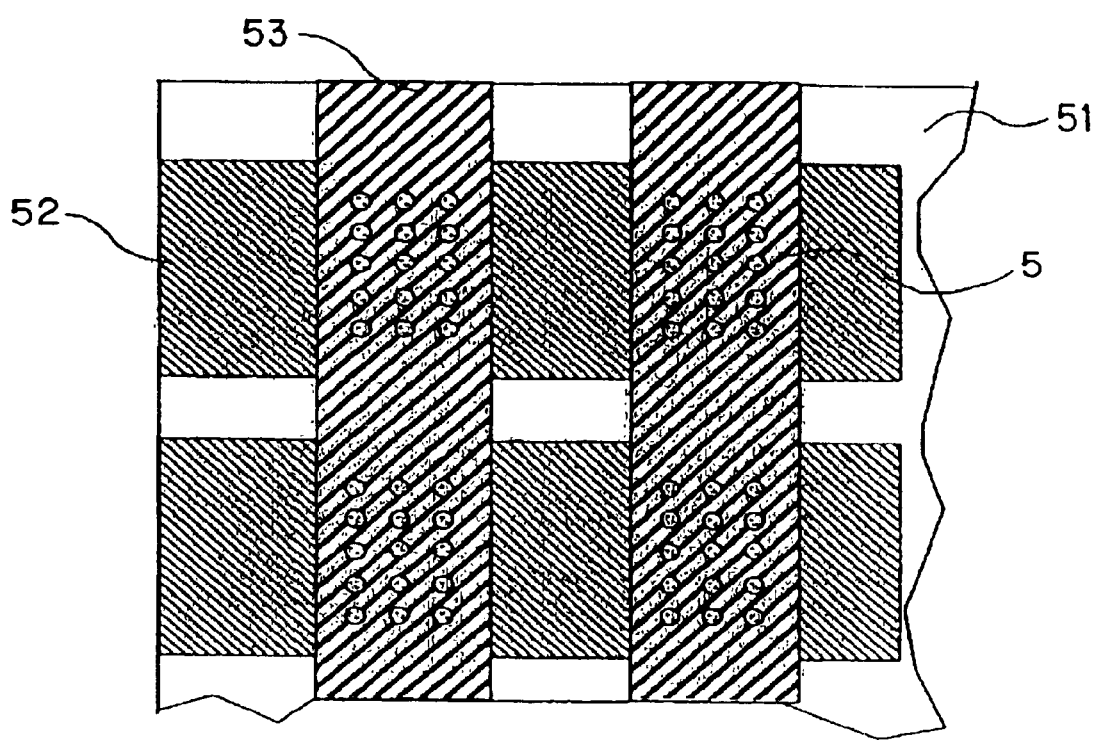
FIG. 5 is a diagram showing an example of an electron source in accordance with an embodiment of the present invention.
Figure 6:
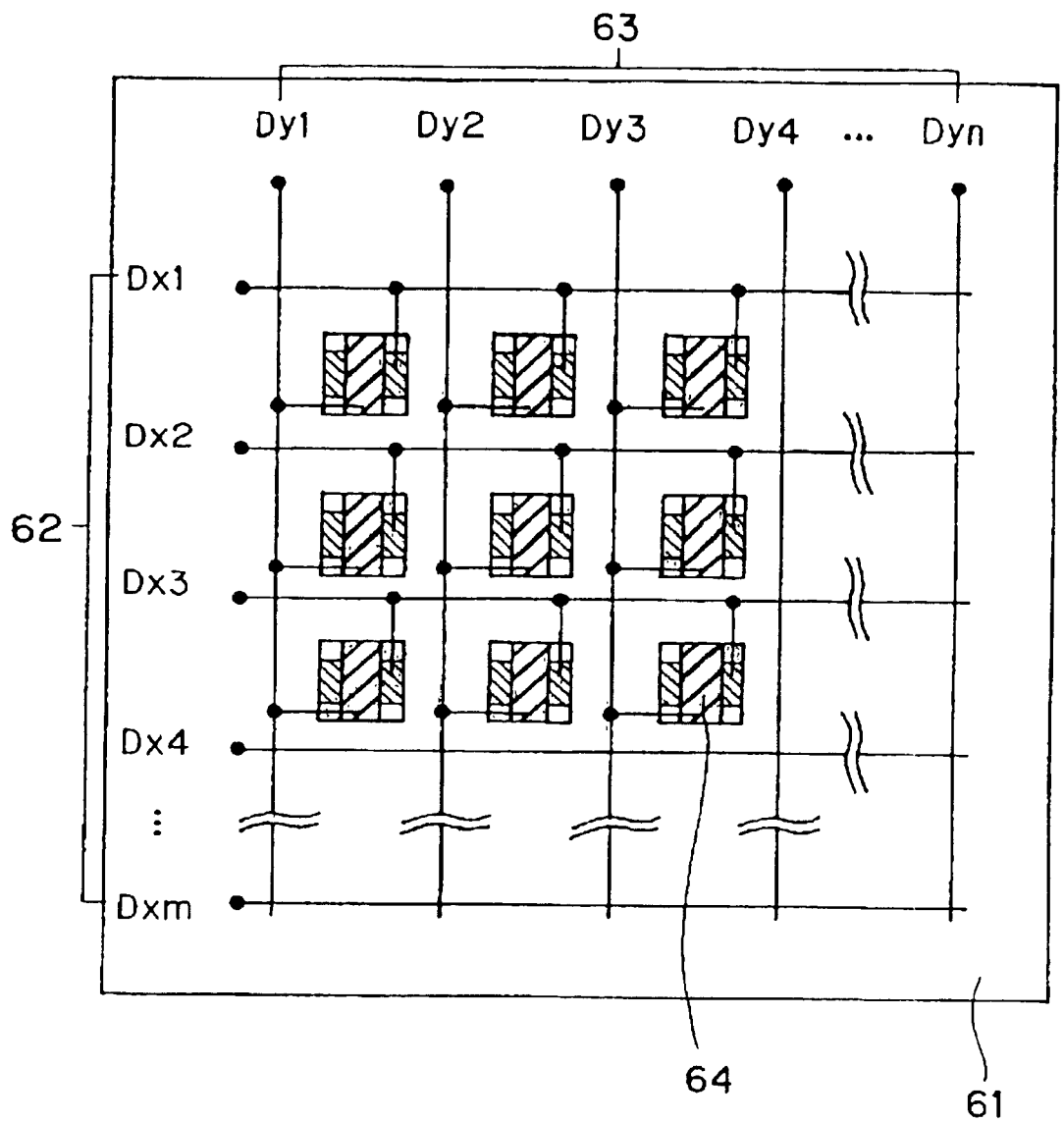
FIG. 6 is a schematic structural diagram showing an electron source with a simple matrix arrangement.

Reference numerals 51 and 61 in FIG. 5 and FIG. 6 denote electron source substrates, reference numerals 52 and 62 denote x-directional wirings, and reference numerals 53 and 63 denote y-directional wirings. Reference numeral 64 denotes an electron-emitting device of this embodiment.

M x-directional wirings 62 are denoted by reference symbols Dx1, Dx2, . . . , Dxm, and can be structured by using a conductive metal or the like formed by a method such as vacuum evaporation, printing, or sputtering. The material, film thickness, and width of the wirings may be suitably designed. N y-directional wirings 63 are denoted by reference symbols Dy1, Dy2, . . . , Dyn, and are formed similarly to the x-directional wirings. An interlayer-insulating layer (not shown) is formed between m x-directional wirings 62 and the n y-directional wirings 63, electrically separating both wirings. (Note that m and n are both positive integers.)

The interlayer-insulating layer (not shown) is structured by $SiO_2$ or the like formed using a method such as vacuum evaporation, printing, or sputtering. For example, the interlayer-insulating layer (not shown) may be formed in a desired shape over the entire surface of, or a portion or, the substrate 61 formed the x-directional wirings 62. In particular, the film thickness, material, and its manufacturing method of the interlayer-insulating layer are suitably set such that the wirings are able to withstand the electric potential difference at intersecting portions of the x-directional wirings 62 and the y-directional wirings 63. The x-directional wirings 62 and the y-directional wirings 63 are each brought out to external terminals.

There are cases in which the m x-directional wirings 62 structuring the electron-emitting device 64 also serve as the cathode electrodes 2, there are cases in which the n y-directional wirings 63 also serve as the gate electrodes 4, and there are cases in which the interlayer-insulating film also serves as the insulating layer 3.

A scanning signal applying means (not shown) for applying a scanning signal in order to select a row of the electron-emitting devices 64 disposed in the x-direction is connected to the x-directional wirings 62. On the other hand, a modulation signal generating means (not shown) for modulating each column of the electron-emitting devices 64 disposed in the y-direction corresponded to an input signal is connected to the y-directional wirings 63. The driver voltage applied to each of the electron-emitting devices 64 is supplied as a voltage difference between a scanning signal and a modulation signal applied to the devices 64.

Figure 7:
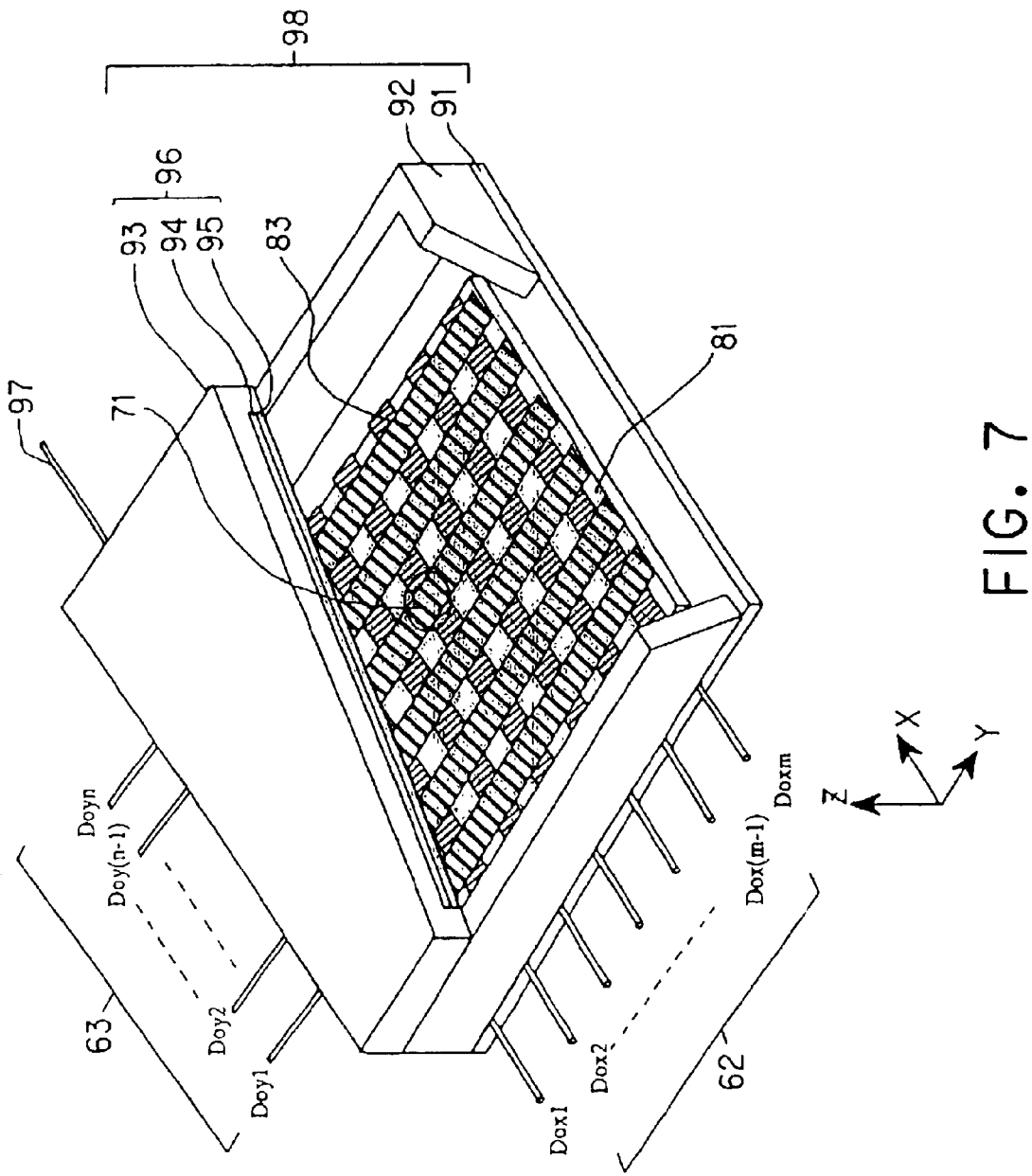
FIG. 7 is a schematic structural diagram showing an image-forming apparatus in accordance with an embodiment mode of the present invention.

It becomes possible to select individual devices and drive them independently using the simple matrix wirings in the above structure. An image-forming apparatus structured using an electron source having this type of simple matrix arrangement is explained using FIG. 7. FIG. 7 is a schematic diagram showing an example of a display panel of an image-forming apparatus.

In FIG. 7, reference numeral 71 denotes an electron-emitting device, reference numeral 81 denotes an electron source substrate on which a plurality of the electron-emitting devices are disposed, reference numeral 91 denotes a rear plate to which the electron source substrate 81 is fixed, and reference numeral 96 denotes a face plate on which a fluorescent film 94, a metal back 95, and the like are formed on an inner face of a glass substrate 93. Reference numeral 92 denotes a support frame, and the rear plate 91 and the face plate 96 are connected to the support frame 92 using frit glass or the like.

An envelope (panel) 98 is structured by the face plate 96, the support frame 92, and the rear plate 91, as stated above. The rear plate 91 is formed mainly with an aim of reinforcing the strength of the substrate 81. Therefore, if the substrate 81 itself has sufficient strength, a separate rear plate 91 can be omitted. The substrate 81 and the rear plate 91 may also have all in one structure.

Frit glass is coated on the bonding surface where the face plate 96 which arranges on its inner surface the fluorescent film 94 and the metal back 95, the rear plate 91, and the support frame 92 are joined together. The face plate 96, the support frame 92, and the rear plate 91 are put together at a predetermined position, fixed in place, heated, baked, and sealed.

Further, although various processes can be employed as a heating means for baking and sealing, such as lamp heat treatment using an infrared lamp or the like, and heat treatment using a hot plate, the means for baking and sealing is not limited to those.

Furthermore, an adhesive material for thermally joining a plurality of parts constituting the envelope 98 is not limited to flit glass. Various types of adhesive materials can be employed, so long as they are materials capable of forming a sufficient vacuum atmosphere after the joining process.

The envelope 98 described above is one embodiment of the present invention, but is not limited to this embodiment, and various envelopes can be employed.

As another example, the support frame 92 may be directly sealed on to the substrate 81, and the envelope 98 may be structured by the face plate 96, the support frame 92, and the substrate 81. Further, by disposing supporters (not shown) referred to as spacers, between the face plate 96 and the rear plate 91, the envelope 98 having a sufficient strength with respect to the atmospheric pressure can also be structured.

Figure 8A:
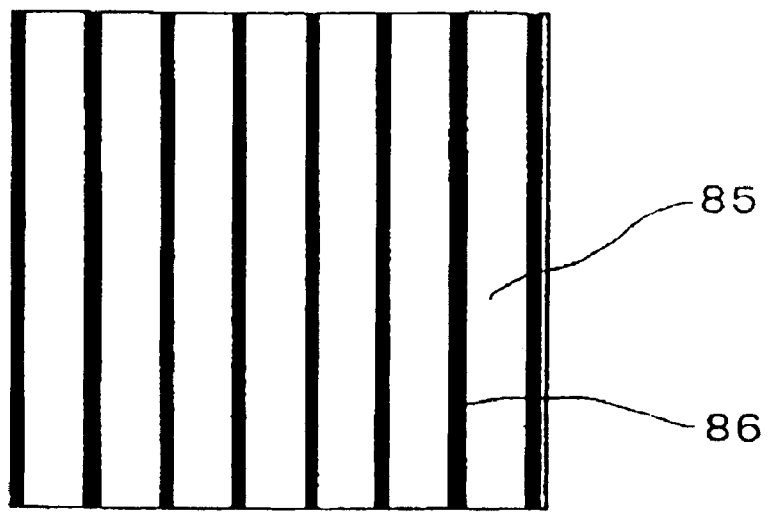
FIG. 8A is a diagram showing a first fluorescent film used in an image-forming apparatus of the present invention.
Figure 8B:
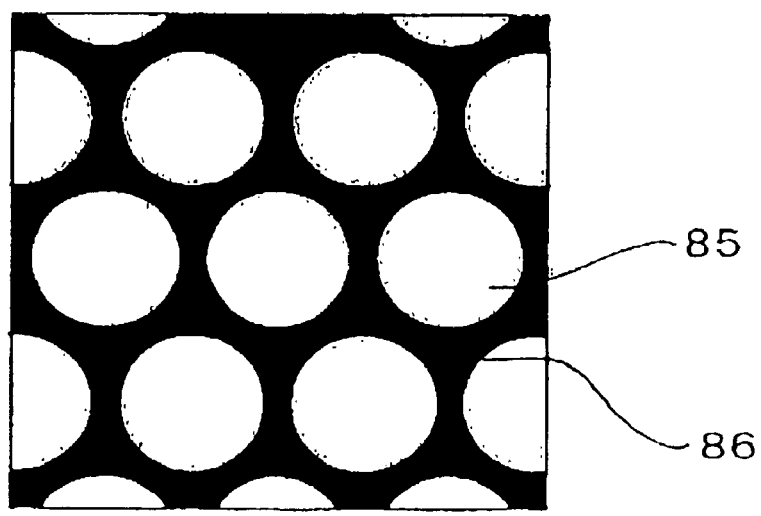
FIG. 8B is a diagram showing a second fluorescent film used in the image-forming apparatus of the present invention.

Further, FIGS. 8A and 8B show schematic diagrams of the fluorescent film 94 formed in the face plate 96. The fluorescent film 94 can also be structured by using only a phosphor 85 for cases of monochrome display. If a color fluorescent film is used, it can be structured from a black color conductive material 86 referred to as a black stripe, a black matrix, or the like, and the phosphor 85.

The aim of forming the black color conductive material 86 referred to as a black stripe, a black matrix, or the like is to make the color mixtures and the like not conspicuous by making black separate coating portions between the respective phosphors 85 of three primary colors which are necessary for a color display, and to suppress contrast from being lowered by the reflection of external light at the fluorescent film 94. In addition to normally used materials having graphite as their main constituent, materials that are conductive, and have having less light transmission and reflection can also be used as the material employed for the black color conductive material 86 referred to as a black stripe, a black matrix, or the like.

Precipitation, printing, and the like can be employed as a method of coating the fluorescent film 94 to the glass substrate 93, irrespective of either a monochrome display or a color display is used. Normally a metal back 95 is formed on an inner surface side of the fluorescent film 94. The aim of forming the metal back 95 are: to improve a luminance by mirror-reflecting light emitted to the inner surface from among all light emitted by the fluorescent film 94 toward the face plate 96 side; to make the metal back 95 act as an electrode for applying an electron beam acceleration voltage; to protect the fluorescent film 94 from damages to be caused by the collision of negative ions generated within the envelope; and the like. The metal back 95 can be manufactured by, after the fluorescent film 94 is formed and the inner surface of the fluorescent film 94 is subjected to a smoothing process (normally referred to as "filming"), depositing Al through vacuum vapor deposition thereon.

A transparent electrode (not shown) may also be formed on the outer surface side of the fluorescent film 94 on the face plate 96 in order to further increase the conductivity of the fluorescent film 94.

The electron beam arrives directly above the electron-emitting device 71 in this embodiment mode, and therefore it is constructed such that registration of the fluorescent film 94 is performed so that the fluorescent film 94 is arranged directly above the electron-emitting device 71.

A vacuum sealing process for sealing the envelope (panel) which is air-tightly bonded is explained next.

The vacuum sealing process is performed such that the envelope (panel) 98 is heated, and evacuation is performed through an exhaust pipe (not shown) by using an exhaust apparatus such as an ion pump or a sorption pump while maintaining a temperature within a range of from 80 to 250° C., and heating the exhaust pipe by using a burner, melting it and performing sealing, after an atmosphere having sufficiently few organic substances is achieved. A gettering process may also be performed in order to maintain pressure after sealing the envelope 98. This is a process in which a getter disposed at a predetermined position (not shown) within the envelope 98 is heated, thereby forming an evaporation film, by using resistance heating, high frequency heating, or the like either immediately before or after performing sealing of the envelope 98. An agent having Ba or the like as its main constituent is normally used as the getter, and maintains the atmosphere within the envelope 98 by an absorption action of the deposition film.

Electron emission develops in the image-forming apparatus structured using the simple matrix arrangement electron source manufactured by the above processes by the application of a voltage to each of the electron-emitting devices through terminals Dx1 to Dxm and Dy1 to Dyn outside the container.

High voltage is applied to the metal back 95 or to a transparent electrode (not shown) through a high voltage terminal 97, and an electron beam is accelerated. The accelerated electrons collide with the fluorescent film 94; light emission is generated; and an image is formed.

Figure 9:
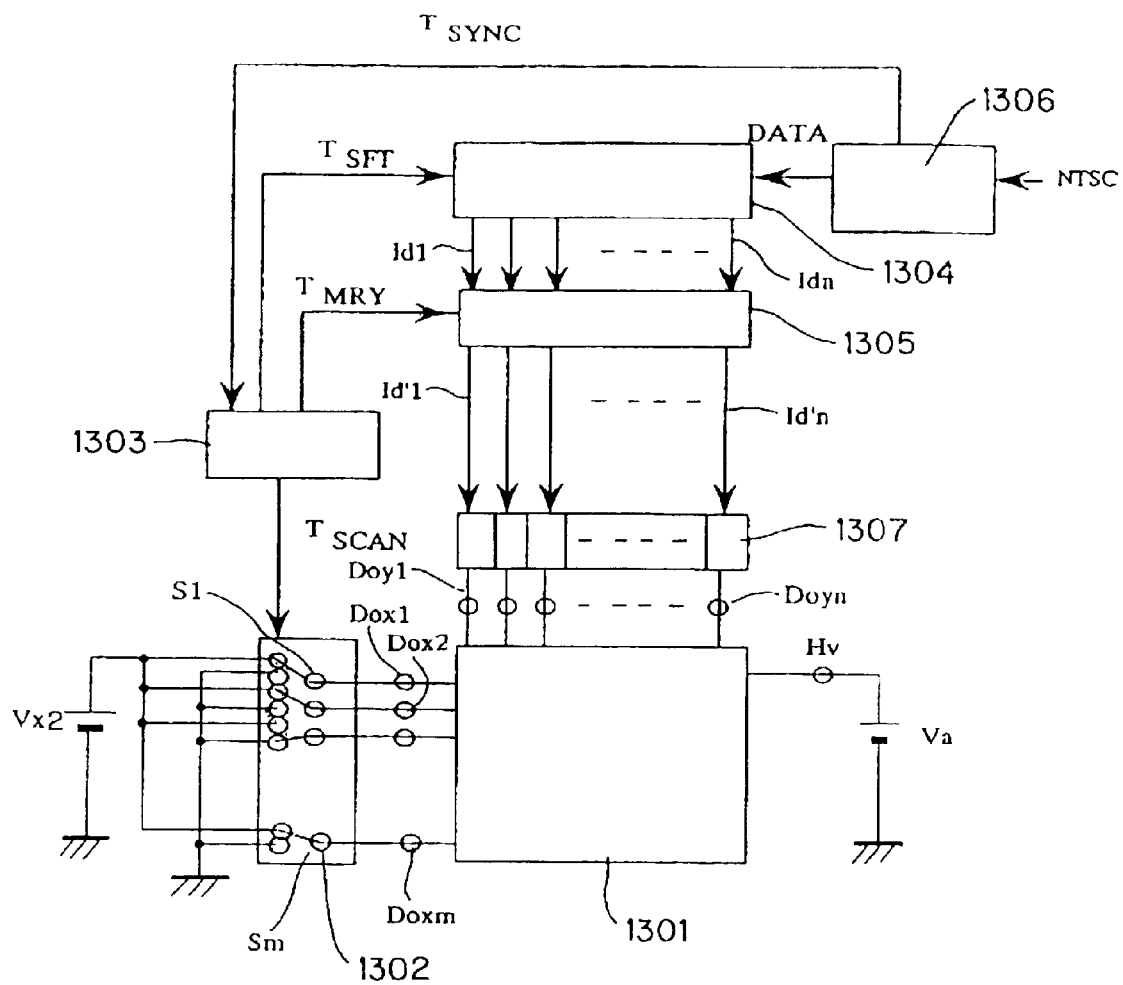
FIG. 9 is a block diagram of a drive controlling system of an image-forming apparatus in accordance with an embodiment mode of the present invention.

FIG. 9 is a block diagram showing an example of a driver circuit for performing display corresponding to an NTSC television signal.

A scanning circuit 1302 is explained. The scanning circuit 1302 is provided with m switching elements inside thereof (shown schematically by reference symbols S1 to Sm within the figure). Each switching element selects either 0 V or a direct current voltage source Vx2, and is electrically connected to terminals Dx1 to Dxm of a display panel 1301.

Each of the switching elements S1 to Sm operates based on a control signal Tscan outputted by a control circuit 1303, and can be structured, for example, by combining with a switching element such as an FET.

The direct current voltage source Vx2 is configured based on the characteristics of the electron-emitting devices.

The control circuit 1303 has a function of adjusting the action of each portion so that proper display based upon an image signal inputted from the outside can be performed. The control circuit 1303 generates respective control signals Tscan, Tsft, and Tmry for each portion based on a synchronous signal Tsync sent from a synchronous signal separator circuit 1306.

The synchronous signal separator circuit 1306 is a circuit for separating synchronous signal components and luminance components from an NTSC signal television signal input from the outside, and can be structured by using a general frequency separator (filter) circuit or the like. The synchronous signal separated by the synchronous signal separator circuit 1306 is constructed by a vertical synchronous signal and a horizontal synchronous signal, and for convenience of explanation, is shown in the figures here as the Tsync signal. The luminance signal components of the image signal separated from the television signal are expressed as a DATA signal for convenience. The DATA signal is inputted to a shift register 1304.

The shift register 1304 is a circuit for performing serial/parallel conversion of the DATA signal inputted chronologically and serially per single line of image, and operates based on the control signal Tsft sent from the control circuit 1303 (that is, the control signal Tsft can also be a shift clock of the shift register 1304). The one line image portion of data (corresponding to the drive data for the n electron-emitting devices) converted between serial and parallel is outputted from the shift register 1304 as n parallel signals Id1 to Idn.

A line memory 1305 is a memory device for storing data of one line image for a required period of time, and appropriately stores the contents of the parallel signals Id1 to Idn in accordance with the control signal Tmry sent from the control circuit 1303. The stored contents are outputted as Id'1 to Id'n, and inputted to a modulation signal generator 1307.

The modulation signal generator 1307 is a signal source for generating a signal for appropriately driving and modulating each of the electron-emitting devices of this embodiment mode in accordance with the image data Id'1 to Id'n. Signals outputted by the modulation signal generator 1307 are applied to the electron-emitting devices of the present invention within the display panel 1301 through terminals Doy1 to Doyn.

For cases in which a pulse shape voltage is applied to the devices, for example, electrons emission does not develop even if a voltage less than the threshold value for electron emission is applied, but an electron beam is output for cases in which a voltage equal to or greater than the threshold value is applied. It is possible to control the intensity of the output electron beam by changing the pulse wave peak value Vm. Further, it is possible to control the total amount of electric charge of the output electron beam by changing a pulse width Pw.

Therefore, a voltage modulation method, a pulse width modulation method, and the like can be employed as methods for modulating the electron-emitting devices in accordance with an input signal.

When implementing the voltage modulation method, a voltage modulation circuit, which generates a voltage pulse of a constant length and appropriately modulates a pulse wave peak value in accordance with input data, can be used as the modulation signal generator 1307.

When implementing the pulse width modulation method, a pulse width modulation circuit, which generates a voltage pulse of a constant wave peak value and appropriately modulates a pulse width in accordance with input data, car be used as the modulation signal generator 1307.

Digital signal type circuits and analog signal type circuits can be employed for the shift register 1304 and the line memory 1305. This is because serial/parallel conversion and storage of the image signal may be performed at a predetermined speed.

It is necessary to make the signal DATA, outputted by the synchronous signal separation circuit 1306, into a digital signal for cases of using a digital signal type circuit, and this may be accomplished by forming an A/D converter in an output portion of the synchronization signal separation circuit 1306. The circuit to be used in the modulation signal generator 1307 will differ somewhat depending upon whether the signal output of the line memory 1305 is a digital signal or an analog signal. That is, a D/A converter circuit is used, for example, in the modulation signal generator 1307, and circuits such as an amplifier circuit are added if necessary, if a voltage modulation method using a digital signal is used.

For cases of pulse width modulation, a circuit combining a high speed oscillator, a counter for counting the number of waves outputted by the oscillator, and a comparator for comparing the counter output value with the value outputted by the memory is used for the modulation signal generator 1307, for example, for the pulse width modulation case. An amplifier that performs voltage amplification of the pulse width modulated modulation signal outputted by the comparator to a drive voltage for driving the electron-emitting device of the present invention can also be added.

For a case of a voltage modulation method that uses an analog signal, an amplifier circuit that uses an operation amplifier and the like can be employed as the modulation signal generator 1307, for example, and circuits such as a level shifter circuit can also be added if necessary.

A voltage control oscillator circuit (VCO) can be employed when using the pulse width modulation method, for example, and an amplifier for voltage amplification up to a drive voltage for driving the electron-emitting device of the present invention can also be added if necessary.

The structure of the image-forming apparatus discussed here is one example of an image-forming apparatus capable of applying the electron-emitting device of this embodiment mode, and various modifications based on the technical concept of the present invention are also possible. Although NTSC signal is given as the input signal type here, the input signal is not limited to NTSC signal, and in addition to PAL and SWECAM signals, TV signals having multiple scanning lines (for example, high definition TV such as MUSE) can also be employed.

Further, in addition to being used as a display device, the image-forming apparatus and the like can also be used as an optical printer structured using photosensitive drums and the like.

EMBODIMENTS

Embodiments of the present invention are explained in detail below.
Embodiment 1
FIGS. 1A and 1B show Embodiment 1 of the present invention. Further, an example of a manufacturing method thereof is shown in FIGS. 4A to 4G. The manufacturing method is explained.
Process 1
First, soda lime glass is used as the substrate 1 as shown in FIG. 4A. Ta is formed to a thickness of 800 nm as the cathode electrode 2 after sufficient washing is performed.

Next, $SiO_2$ is deposited to a thickness of 500 nm as the insulating layer 3, and Pt is deposited to a thickness of 100 nm as the gate electrode 4 in the stated order.
Process 2
In addition, the Al mask pattern 41 is formed as shown in FIG. 4B by utilizing photolithography.
Process 3
The Pt gate electrode 4 is then etched using Ar plasma etching, and the insulating layer 3 and the cathode electrode 2 are dry etched using $CF_4$ gas, with the mask pattern 41 acting as a mask, as shown in FIG. 4C. An opening having the width w2 equal to 0.4 $\mu$m, the width w3 equal to 1.2 $\mu$m, and the cathode electrode 2 opening thickness t1 equal to 200 nm is thus formed.
Process 4
In addition, the insulating layer 3 is wet etched as shown in FIG. 4D, and the central portion is removed by lifting off. The insulating layer 3 on the outside of the opening is also etched at the same degree.
Process 5
The overall opening is then shaved by an additional 100 nm using ion milling, forming a desired opening and reducing the protruding portion of the central portion of the opening bottom face, as shown in FIG. 4E.
Process 6
The electron-emitting material 5 consisting of diamond like carbon is then deposited over the entire surface to a thickness on the order of 30 nm by plasma CVD as shown in FIG. 4F. $CH_4$ gas is used as the reaction gas.
Process 7
The mask pattern 41 is then completely removed as shown in FIG. 4G, thus completing the electron-emitting device of Embodiment 1.

Further, a device having a structure of FIG. 13, with w1 the same as in Embodiment 1, is manufactured as a comparative example. The manufacturing process is slightly changed from the processes 2, 3, and 4.

The electron-emitting device of the present invention thus manufactured as stated above and the comparative example are disposed as shown in FIG. 2 with H=2 mm. Va=10 kV, and Vg=20 V.

In this case, an electrode on which a phosphor is applied is used as the anode electrode 7, and the electron beam size was observed. The term electron beam size as referred to here is taken as the size up through a region of 10% of the peak luminance at the light emitting phosphor.

Figure 10A:
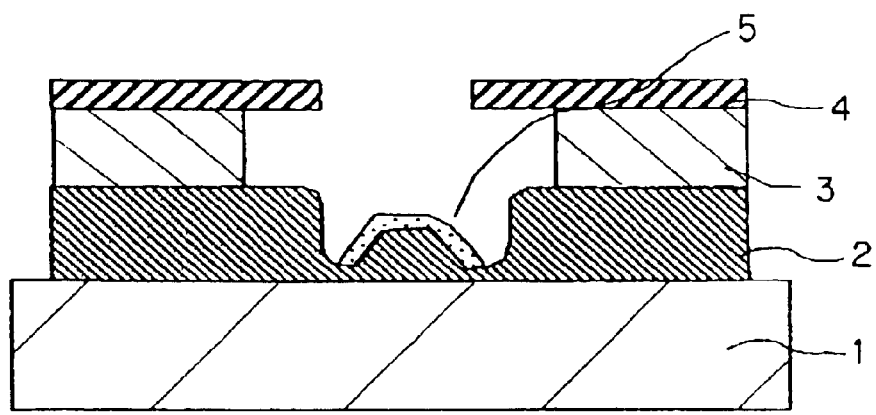
FIG. 10A is a diagram showing Embodiment 2 of the present invention.

Compared to the comparative example, the beam size becomes 85% with the device of Embodiment 1. Further, the frequency at which leak current is develops is on the order of 1/10 compared to the comparative example.
Embodiment 2
FIG. 10A is a variation example of Embodiment 1, and is an example in which the edge is blunt in the process of manufacturing the cathode electrode 2.

The opening is minute in Embodiment 2, and for cases in which the peripheral portion region cannot be made small compared to the opening, the above-mentioned phenomenon is caused by etching. Manufacturing is performed in Embodiment 2 with the width w3 of the opening of the gate electrode 4 being set to 0.8 $\mu$m.

A beam size similar to that of Embodiment 1 can also be obtained in Embodiment 2 by optimizing t3. In this case, it is also possible to manufacture the peripheral portion and the central portion of the opening bottom face of the cathode electrode 2 by also shaving the central portion of the cathode electrode 2 when manufacturing the peripheral portion, and performing the etching process, which must be performed twice in Embodiment 1, only once here.

Embodiment 3

Figure 10B:
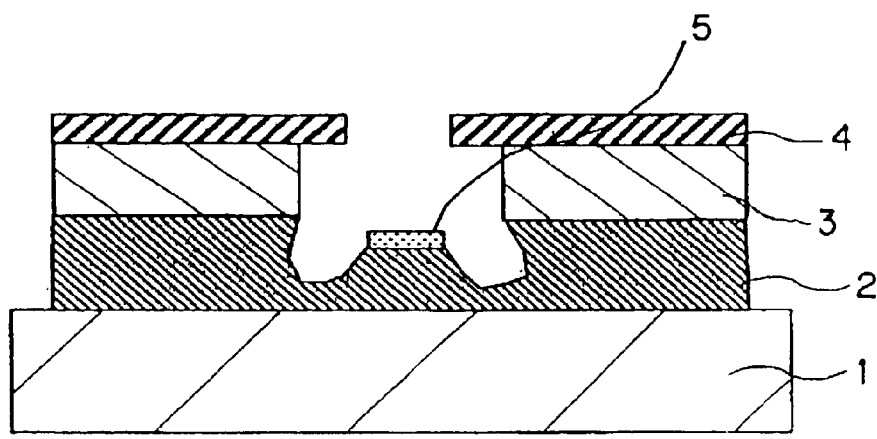
FIG. 10B is a diagram showing Embodiment 3 of the present invention.

FIG. 10B is an example in which the size w1 of the opening of the gate electrode 4 is made smaller than the opening of the cathode electrode 2. In this structure, the electron-emitting material 5 does not exist in the edge portion of the cathode electrode 2, and therefore the leak current of the electron-emitting material 5 can be reduced to nearly zero.

A method of etching by using a focused ion beam from an oblique angle can be considered in etching the peripheral portion as a manufacturing method for forming this structure.

Embodiment 4

Figure 10C:
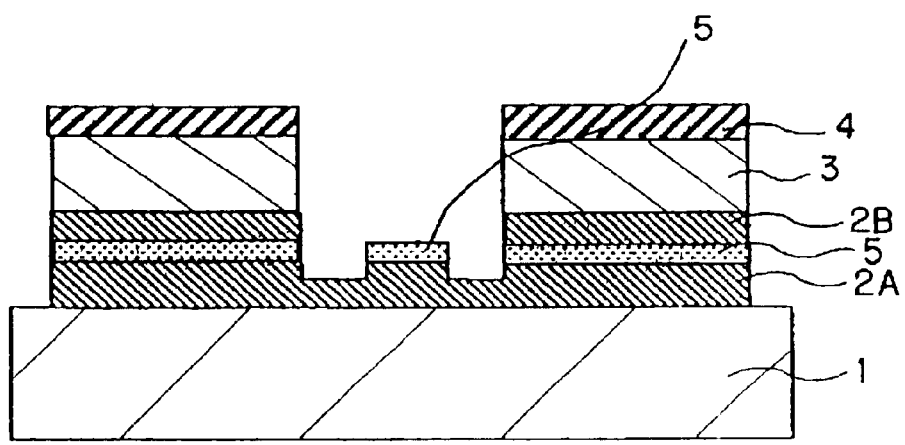
FIG. 10C is a diagram showing Embodiment 4 of the present invention.

FIG. 10C is an example in which the electron-emitting material 5 is laminated between the cathode electrodes 2.

The effect that the electron-emitting material 5 exists only above the elevated central portion of a cathode electrode 2A is also obtained with this structure. Furthermore, the electron-emitting material 5 is laminated in advance, and therefore influence by the leak current is avoided.

Embodiment 5

Figure 11A:
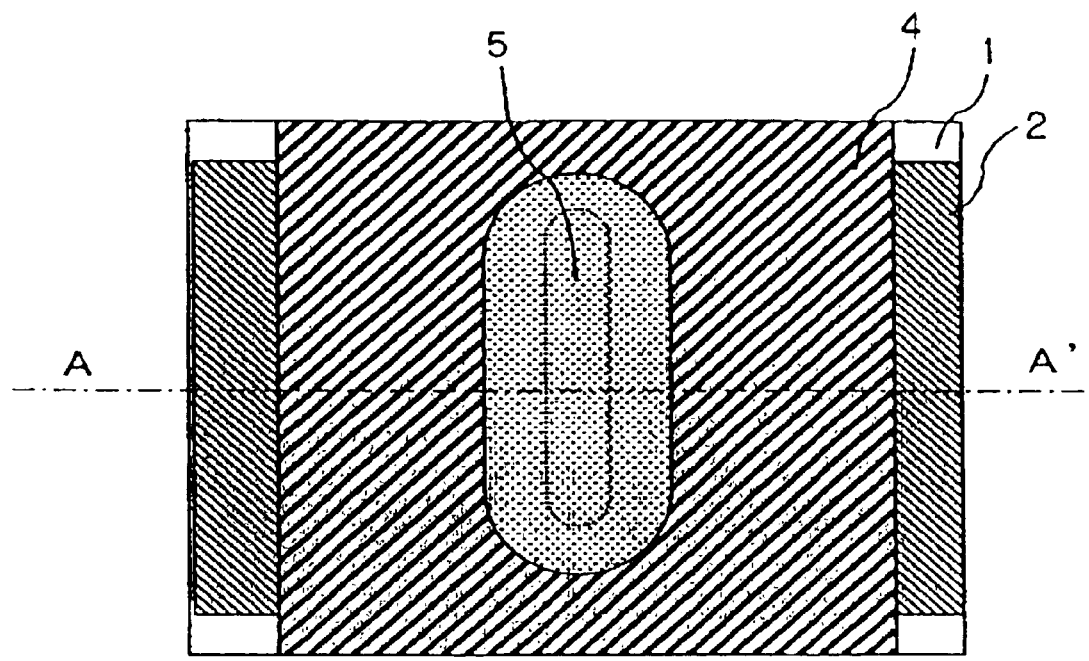
FIG. 11A is a diagram showing Embodiment 5 of the present invention.
Figure 11B:
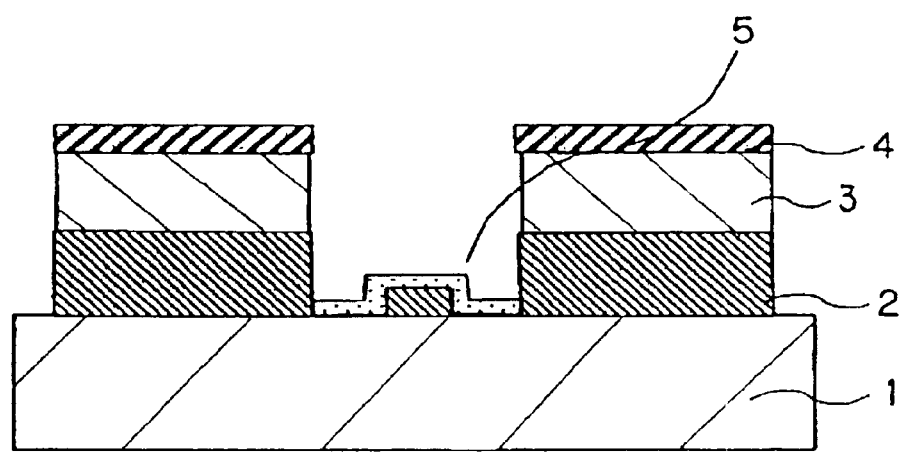
FIG. 11B is a cross sectional view taken along the line A–A' of FIG. 11A.

In addition, Embodiment 5 is shown in FIGS. 11A and 11B. Embodiment 5 is an example in which the opening is not circular in shape, but has a linear shape. Further, it is a structure having the electric current limiting mechanism shown by FIG. 3.

It is possible to form this structure by using a process similar to that of Embodiment 1 and setting the thickness of the cathode electrode to 300 nm in the process 1.

Further, conductive amorphous carbon is laminated to a thickness of 50 nm as the electron-emitting material 5.

Electrical connections are thus formed in a horizontal direction, through the high resistance electron-emitting material 5, in the emitting region formed in the central portion, and therefore this works as an electric current controlling mechanism.

The amount of electrons emitted is thus stabilized when using this structure in an electron-emitting device.

Embodiment 6

Figure 12A:
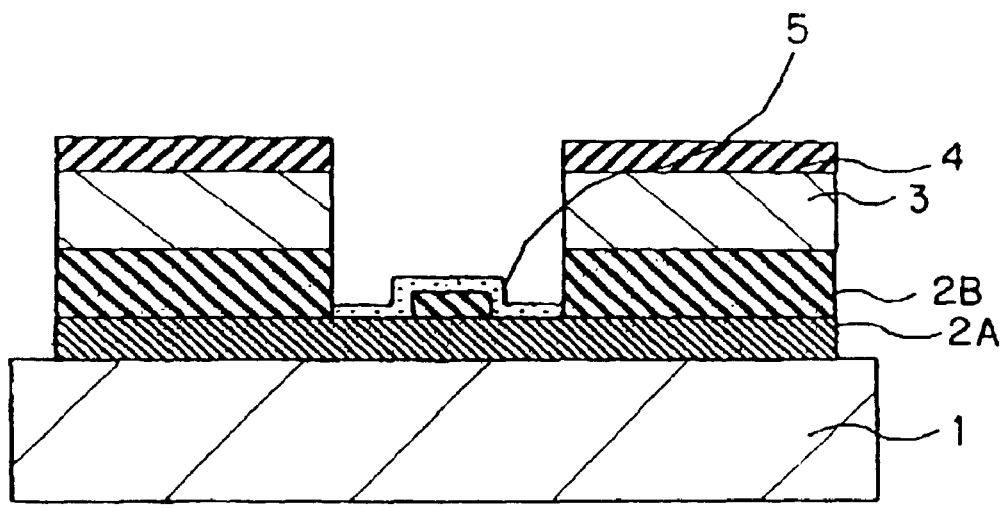
FIG. 12A is a diagram showing Embodiment 6 of the present invention.

Embodiment 6 is shown in FIG. 12A as another structure having an electric current controlling mechanism. Reference symbol 2B within the figure is a cathode electrode having a higher resistance than those of reference symbols 2A and 2C.

In FIG. 12A, 2A is structured by Ti having a thickness of 500 nm, and 2B is structured by TiN with t1=200 nm and t2=150 nm. The cathode electrode 2B of the central portion which becomes an electron-emitting region is high resistance, and in addition is thin, and therefore works as the electric current control mechanism. Other portions are connected by the low resistance cathode electrode 2A.

This structure therefore becomes the electric current control mechanism similar to that of other embodiments.

Embodiment 7

Figure 12B:
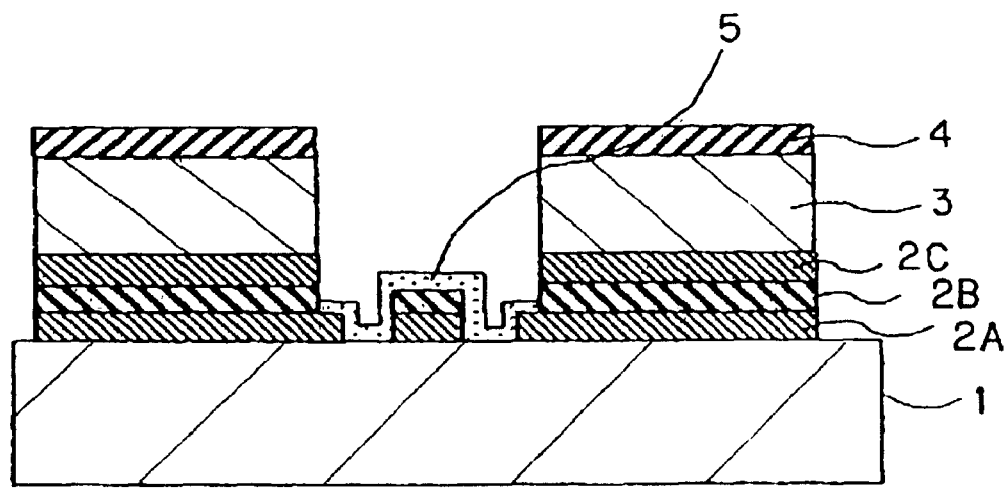
FIG. 12B is a diagram showing Embodiment 7 of the present invention.

A seventh embodiment of a structure having an electric current control mechanism, in which the cathode electrode is made from three layers, is shown in FIG. 12B. The reference symbol 2B within the figure denotes a cathode electrode having a higher resistance than that of the cathode electrodes 2A and 2C.

The cathode electrode 2A is structured by 500 nm of Al, 2B is structured by 50 nm of TiN, and 2C is structured by 150 nm of Ti. This structure becomes one in which the high resistance cathode electrode 2B is exposed in the emission region of the central portion, and the electron-emitting material 5 is laminated on an upper portion of the cathode electrode 2B.

This structure therefore becomes the electric current control mechanism similar to that of other embodiments.

Further, this becomes a structure in which the lowest layer cathode electrode 2A protrudes slightly into the central portion. This structure is effective in being able to electrically connect the cathode electrode and the electron-emitting material 5 with certainty. The electric field profile can be made sufficiently low change in the lowest layer, and therefore the influence on the electron beam direction can be reduced to nearly zero even when using this type of connection.

Embodiment 8

Display is performed in Embodiment 8 by using electron-emitting devices having a plurality of microscopic holes like that of FIG. 5 as a single pixel, using the electron source shown by FIG. 6, and using the image-forming apparatus shown by FIGS. 7 and 8.

As a result, leak current is small, electron sources having uniform electron-emitting characteristic can be formed, and high definition image display can be performed.

As explained above, the present invention can structure the electron-emitting devices capable of high efficiency electron emission at low voltage, having a small electron beam size, and which are easy to manufacture.

Further, an electron source or an image-forming apparatus having superior performance can be achieved if this type of the electron-emitting device is applied to the electron source or the image-forming apparatus.

What is claimed is:

1. An electron-emitting device comprising:
   a cathode electrode;
   an insulating layer;
   a gate electrode;
   a substrate on which laminated the cathode electrode, the insulating layer and the gate electrode;
   an opening penetrating the insulating layer and the gate electrode; and
   an electron-emitting material disposed within the opening;
   wherein an opening bottom face is formed of a portion of the cathode electrode exposed through the opening and is elevated on a central portion compared with a peripheral portion; and
   a surface of the electron-emitting material existing at least the elevated central portion of the opening bottom face is positioned lower than the height of a boundary between the cathode electrode and the insulating layer.

2. An electron-emitting device according to claim 1, wherein a surface area of the electron-emitting material is substantially equal to, or less than an area of the opening region penetrating the gate electrode.

3. An electron-emitting device according to claim 1, wherein the electron-emitting material is a substantially flat film.

4. An electron-emitting device according to claim 1, wherein the electron-emitting material is at least one material selected from the group consisting of diamond, diamond like carbon, a carbon nano-tube, and a graphite nano-fiber, having a low work function.

5. An electron-emitting device according to claim 1, wherein a portion of the cathode electrode existing the central portion is separated by the peripheral portion of the opening bottom face, and is electrically connected by the electron-emitting material laminated on the peripheral portion of the opening bottom face.

6. An electron-emitting device according to claim 5, wherein the electron-emitting material is a higher resistance film than the cathode electrode.

7. An electron-emitting device according to claim 1, wherein the cathode electrode is structured from a plurality of layers having different resistivities.

8. An image-forming apparatus comprising:
   an electron source using the electron-emitting device as described in claim 1; and
   an image-forming material which forms an image by using electrons emitted from the electron source.

9. An electron-emitting device according to claim 1, wherein the electron-emitting material is formed while being sandwiched by the cathode electrodes.

10. An electron-emitting device according to claim 9, wherein the electron-emitting material is at least one material selected from the group consisting of diamond, diamond like carbon, a carbon nano-tube, and a graphite nano-fiber, having a low work function.

11. An image-forming apparatus comprising:
    an electron source using the electron-emitting device as described in claim 9; and
    an image-forming material which forms an image by using electrons emitted from the electron source.

* * * * *

UNITED STATES PATENT AND TRADEMARK OFFICE
CERTIFICATE OF CORRECTION

PATENT NO. : 6,717,340 B2
DATED : April 6, 2004
INVENTOR(S) : Michiyo Nishimura

It is certified that error appears in the above-identified patent and that said Letters Patent is hereby corrected as shown below:

Column 1,
Line 37, "spread" should read -- to spread --;
Line 59, "apposition" should read -- a position --.

Column 2,
Line 37, "objet" should read -- object --;
Line 48, "which" should read -- which are --; and
Line 58, "at least" should read -- at least at --.

Column 3,
Line 10, "existing" should read -- existing at --.

Column 5,
Line 44, "a preferably." should read -- preferable. --; and
Line 47, "filed" should read -- field --.

Column 6,
Line 10, "smaller so much." should read -- so much smaller. --; and
Line 47, "The" should read -- the --.

Column 8,
Line 58, "discribed" should read -- described --.

Column 9,
Line 28, "or," should read -- of, --.

Column 10,
Line 27, "flit" should read -- frit --;
Line 56, "having" should be deleted; and
Line 62, "either" should read -- whether --.

Column 13,
Line 1, "car" should read -- can --.

Column 14,
Line 47, "is" (first occurrence) should be deleted.

UNITED STATES PATENT AND TRADEMARK OFFICE
CERTIFICATE OF CORRECTION

PATENT NO. : 6,717,340 B2
DATED : April 6, 2004
INVENTOR(S) : Michiyo Nishimura

It is certified that error appears in the above-identified patent and that said Letters Patent is hereby corrected as shown below:

<u>Column 16,</u>
Line 7, "change" should read -- charge --;
Line 32, "which" should read -- which are --;
Line 42, "at least" should read -- at least at --;
Line 56, "diamond" (second occurrence) should read -- diamond- --; and
Line 60, "existing" should read -- existing at --.

<u>Column 18,</u>
Line 2, "diamond" (second occurrence) should read -- diamond --.

Signed and Sealed this

Seventh Day of December, 2004

JON W. DUDAS
*Director of the United States Patent and Trademark Office*